(12) United States Patent
Maassarani

(10) Patent No.: US 9,539,924 B2
(45) Date of Patent: Jan. 10, 2017

(54) SEAT BACK HEADREST

(71) Applicant: Sami Maassarani, Birmingham, MI (US)

(72) Inventor: Sami Maassarani, Birmingham, MI (US)

( * ) Notice: Subject to any disclaimer, the term of this patent is extended or adjusted under 35 U.S.C. 154(b) by 291 days.

(21) Appl. No.: 14/101,781

(22) Filed: Dec. 10, 2013

(65) Prior Publication Data
US 2014/0159460 A1  Jun. 12, 2014

Related U.S. Application Data

(60) Provisional application No. 61/735,579, filed on Dec. 11, 2012.

(51) Int. Cl.
*B60N 2/48* (2006.01)
*B60N 2/26* (2006.01)

(52) U.S. Cl.
CPC ............. *B60N 2/4879* (2013.01); *B60N 2/26* (2013.01); *B60N 2/4882* (2013.01)

(58) Field of Classification Search
CPC ....... B60N 2/4879; B60N 2/4882; B60N 2/26; B60N 2/48; B61D 33/005; B60R 22/001; B64D 11/0642; A47C 7/383
USPC ........................................................ 297/397
See application file for complete search history.

(56) References Cited

U.S. PATENT DOCUMENTS

| 2,464,435 | A | * | 3/1949 | Conradt | ............... | B60N 2/4879 |
| | | | | | | 297/397 |
| 2,726,714 | A | * | 12/1955 | McAndrews | ......... | B60R 22/105 |
| | | | | | | 128/876 |
| 3,226,159 | A | * | 12/1965 | Binding | ............... | B60N 2/4879 |
| | | | | | | 297/397 |
| 4,182,322 | A | * | 1/1980 | Miller | ................ | A61F 5/05883 |
| | | | | | | 5/637 |
| 4,339,151 | A | * | 7/1982 | Riggs | ..................... | A47C 7/383 |
| | | | | | | 128/857 |
| 4,440,443 | A | * | 4/1984 | Nordskog | ................ | A47C 7/38 |
| | | | | | | 297/217.4 |
| 4,607,885 | A | * | 8/1986 | del Fierro | .............. | B60N 2/286 |
| | | | | | | 128/869 |
| 4,707,031 | A | * | 11/1987 | Meistrell | ............... | B60R 22/001 |
| | | | | | | 128/869 |
| 4,971,393 | A | * | 11/1990 | Maisenhalder | ........ | A47C 7/383 |
| | | | | | | 248/118 |
| 5,378,042 | A | * | 1/1995 | Daneshvar | ............. | A47C 7/383 |
| | | | | | | 128/847 |
| 5,505,523 | A | * | 4/1996 | Wang | ..................... | A47C 7/383 |
| | | | | | | 128/870 |
| 5,511,854 | A | * | 4/1996 | Cordia | .................. | A61F 5/3707 |
| | | | | | | 297/393 |
| 6,266,825 | B1 | * | 7/2001 | Floyd | ..................... | A47C 7/383 |
| | | | | | | 2/311 |

(Continued)

*Primary Examiner* — David R Dunn
*Assistant Examiner* — Tania Abraham
(74) *Attorney, Agent, or Firm* — Young Basile Hanlon & MacFarlane, P.C.

(57) ABSTRACT

A headrest removably engageable with the seat back includes a seat back mounting member adapted to encircle a seat back headrest which has side portions engageable with end portions of a cushion configured to surround at least a portion of the user's head. A support is carried on the seat back mounting member to engage the seat back to assist in supporting the headrest on the seat back.

12 Claims, 4 Drawing Sheets

(56) References Cited

U.S. PATENT DOCUMENTS

| | | | | |
|---|---|---|---|---|
| 6,301,716 B1* | 10/2001 | Ross | ............... | A61F 5/3707 |
| | | | | 2/171 |
| 6,305,749 B1* | 10/2001 | O'Connor | ............... | A47C 7/383 |
| | | | | 297/397 |
| 6,607,245 B1* | 8/2003 | Scher | ............... | A47C 7/383 |
| | | | | 297/393 |
| 7,832,802 B2* | 11/2010 | Ehlers | ............... | A47C 7/38 |
| | | | | 297/393 |
| 8,381,316 B2* | 2/2013 | Edwards | ............... | A42B 1/006 |
| | | | | 2/175.3 |
| 8,708,415 B2* | 4/2014 | Gabriel | ............... | B60N 2/286 |
| | | | | 297/181 |
| 2010/0102604 A1* | 4/2010 | Barnes | ............... | B60N 2/2821 |
| | | | | 297/250.1 |
| 2012/0007405 A1* | 1/2012 | Kim | ............... | B60N 2/4882 |
| | | | | 297/397 |
| 2012/0068515 A1* | 3/2012 | Bogen | ............... | B60N 2/4879 |
| | | | | 297/393 |

\* cited by examiner

SEAT BACK HEADREST

CROSS REFERENCE TO CO-PENDING APPLICATION

This application claims priority benefit to the Dec. 11, 2012 filing date of co-pending U.S. provisional patent application, filed in the name of Sami Maassarani, and entitled, SEAT BACK HEADREST, the entire contents of which are incorporated herein in its entirety.

BACKGROUND

In order to alleviate the neck strain associated with a person trying to sleep while seated in a seat, such as a vehicle seat, airplane seat, train seat, etc., and maintaining his or her head in a generally upright, vertical position, a variety of different headrests have been devised for supporting a portion of the user's head, such as each cheek or in a fully face encircling manner.

Maintaining a sleeping person's head in a generally upright position while the person is sleeping in a seat is particularly desirable from a safety standpoint for small children who frequently fall asleep while riding in a vehicle, airplane, or train.

The various devised headrests are either designed as part of the vehicle head restraint or are portable and removably attachable to the seatback for deployment and use. However, the previously devised headrests are either cumbersome or unsightly to deploy and attach to a seat back or, do not have easily adjustable positions to enable use of the headrest with different sized individuals or with children as the children grow.

It would be desirable to provide a seat headrest which overcomes these difficulties and provides ease of attachment and ease of adjustability.

SUMMARY

A headrest removably engageable with a seat back includes a seat back mounting member having a leg and opposed side portions extending from the leg adapted to encircle a seat back headrest, and a cushion configured to engage one of a front and a side of a user's head. The ends of the side portions of the seat back mounting member and opposed ends of the cushion are configured for complimentary engagement. A support is carried on at least one or both of the side portions of the seat back mounting member and configured to engage the seat back to assist in supporting the headrest on the seat back.

The leg and the side portions of the headrest can be formed as an integral one-piece member.

The support can be integrally formed as unitary part of the seat back mounting member.

The support can include a flat pad extending from the at least one of the side portions of the seat back mounting member.

The support can include two supports, one support mounted on each of the side portions of the seatback mounting member.

The seat back mounting member can be formed of a moldable plastic material.

The ends of the seatback mounting member and the opposed ends of the cushion can be telescopingly engageable. The telescoping engagement of the end portions of the seatback mounting member and the opposed ends of the cushion can include one of the ends of the side portions of the seat back mounting member and the opposed ends of the cushion having a complementary projection and recess.

The cushion can define a U-shape including a center portion and two opposed end portions.

The leg of the seat back mounting portion can define a block polygonal member.

BRIEF DESCRIPTION OF THE DRAWING

The various features, advantages and other use of the present seat back headrest will become more apparent by referring to the following detailed description and drawing in which.

DETAILED DESCRIPTION

Figure 1:
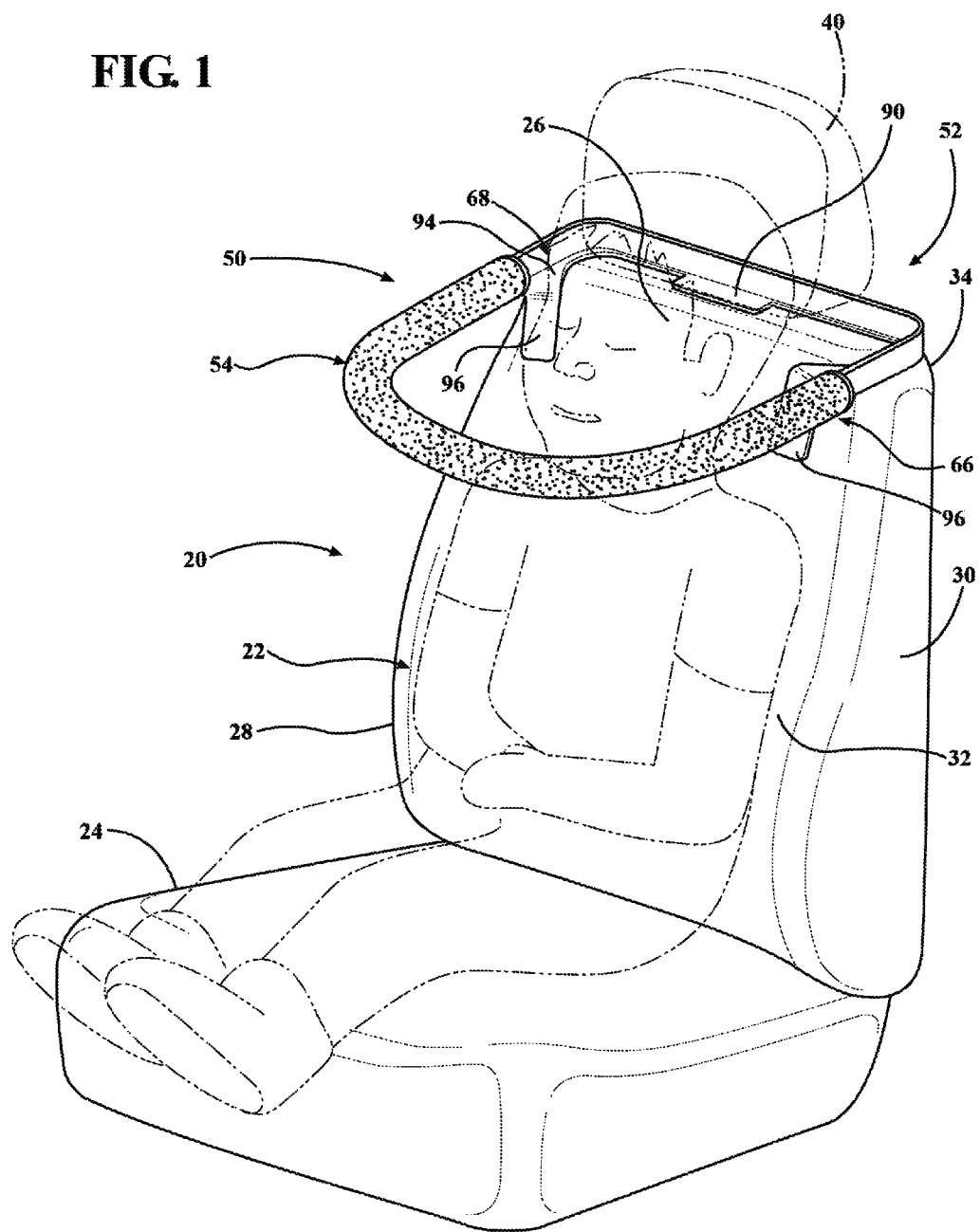
FIG. 1 is a perspective view of one aspect of a seat back headrest mounted on a vehicle seat.
Figure 2:
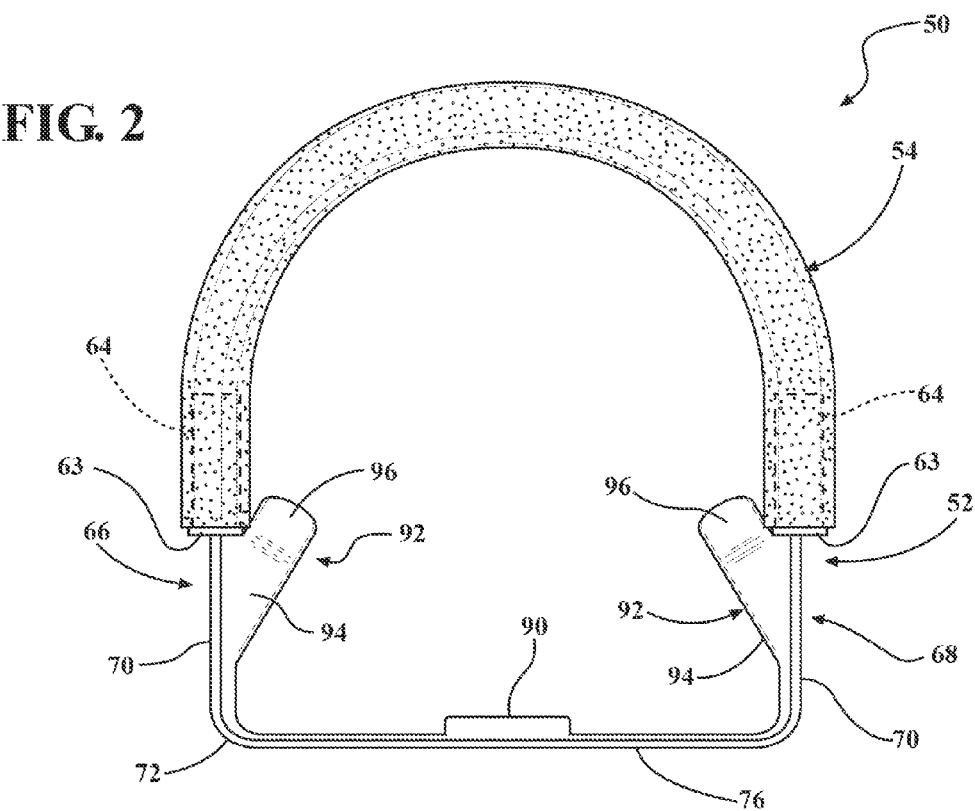
FIG. 2 is a plan view of the seat back headrest shown in FIG. 1.
Figure 3:
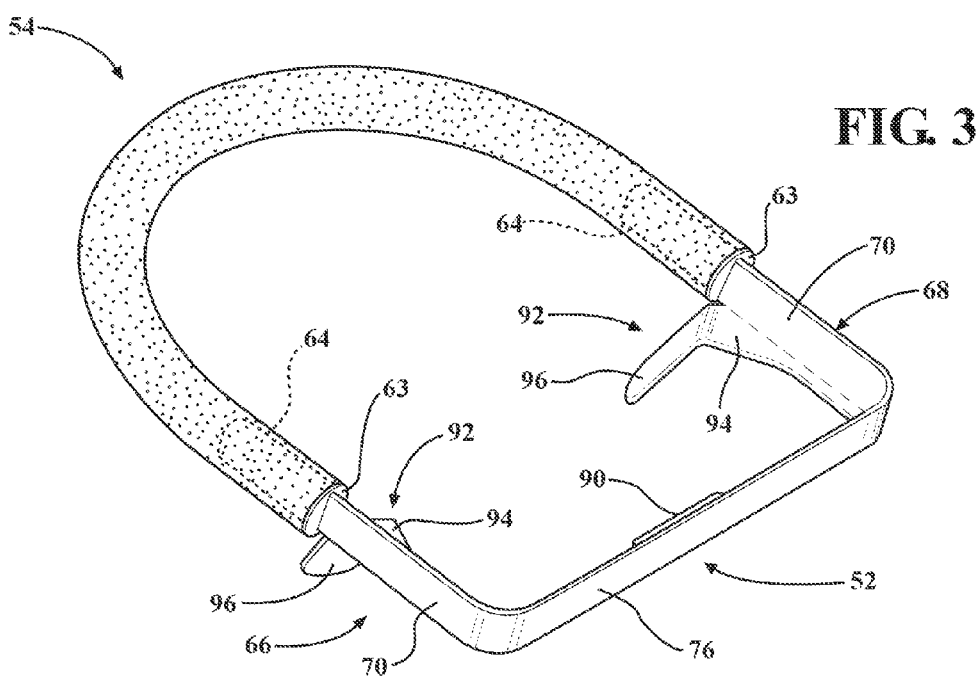
FIG. 3 is a left side perspective view of the seat back headrest shown in FIG. 2.

Referring now to FIGS. 1-5 of the drawing, there is depicted one aspect of a headrest usable on a seat 20. By way of example, the seat 20 may be any type of seat, such as a vehicle seat, an airplane seat, a train seat, a seat use in an office, workspace or home, or a portable child car seat. The seat 20 has a seat back 22 and a seat bottom 24. Depending upon the application, the seat back 22 may be rigidly fixed to the seat bottom 24, such as a rear seat, or may be pivotal from a more generally upright position shown in FIG. 1 to an angled position over the seat bottom 24 as in a front seat or a rear fold down seat.

For purposes of the following description, the seat back 22 includes a top edge 26, opposed side edges 28 and 30, a front surface 32 and an opposed new surface 34.

A vehicle seat back headrest 40 may be integrally formed as part of an upper portion of the seat back 22 extending as an integral part and defining a portion of the top edge 26 of the seat back 22, or as a separate attachment mountable by one or two slidable posts into apertures formed in the top edge 26 of the seat back 22.

As shown in FIGS. 1-5, a portable seat back headrest 50 is removably mountable on the seat back 22 and encircles the seat back headrest 40. The headrest 50 includes a seat back mounting member 52 which may be formed of one or more pieces that are individually joined together into an integral, unitary assembly, and at least one cushion 54.

The cushion 54 may be formed of a number of different soft, compliant materials suitable for safely contacting a user's head, particularly, a child's head. For example, foam or other soft compliant material, such as SANOPRENE, a thermo-plastic elastomer; may be molded, extruded, or otherwise formed in the shape of the cushion 54. Alternately, a different and more rigid foam or other material, such as self-skinning foam, may be used to form an inner core of the cushion 54, which is then covered with an outer decorative, softer, more compliant layer of leather, plastic, fabric, etc., which can be complimentary to the material used in vehicles, airplanes, train or home seats, child car seats, etc.

The cushion 54, although shown as having a generally semi-circular or U-shape with two ends, can also be constructed of two individual J-shaped portions, where one end of each J-shaped portion connects to one end of the mounting member 52. The opposite ends of each J-shaped cushion member may be disposed in close proximity to each other to substantially encircle the front portion of the head of the seat user or be slightly spaced apart. Alternately, Velcro, snaps or other releasable fasteners, may releasibly join the outer ends of the J-shaped cushions together. The use of individual J-shaped cushions would enable, for example, only a single J-shaped cushion employed as part of the headrest 50 on either side of a user's head.

Figure 5:
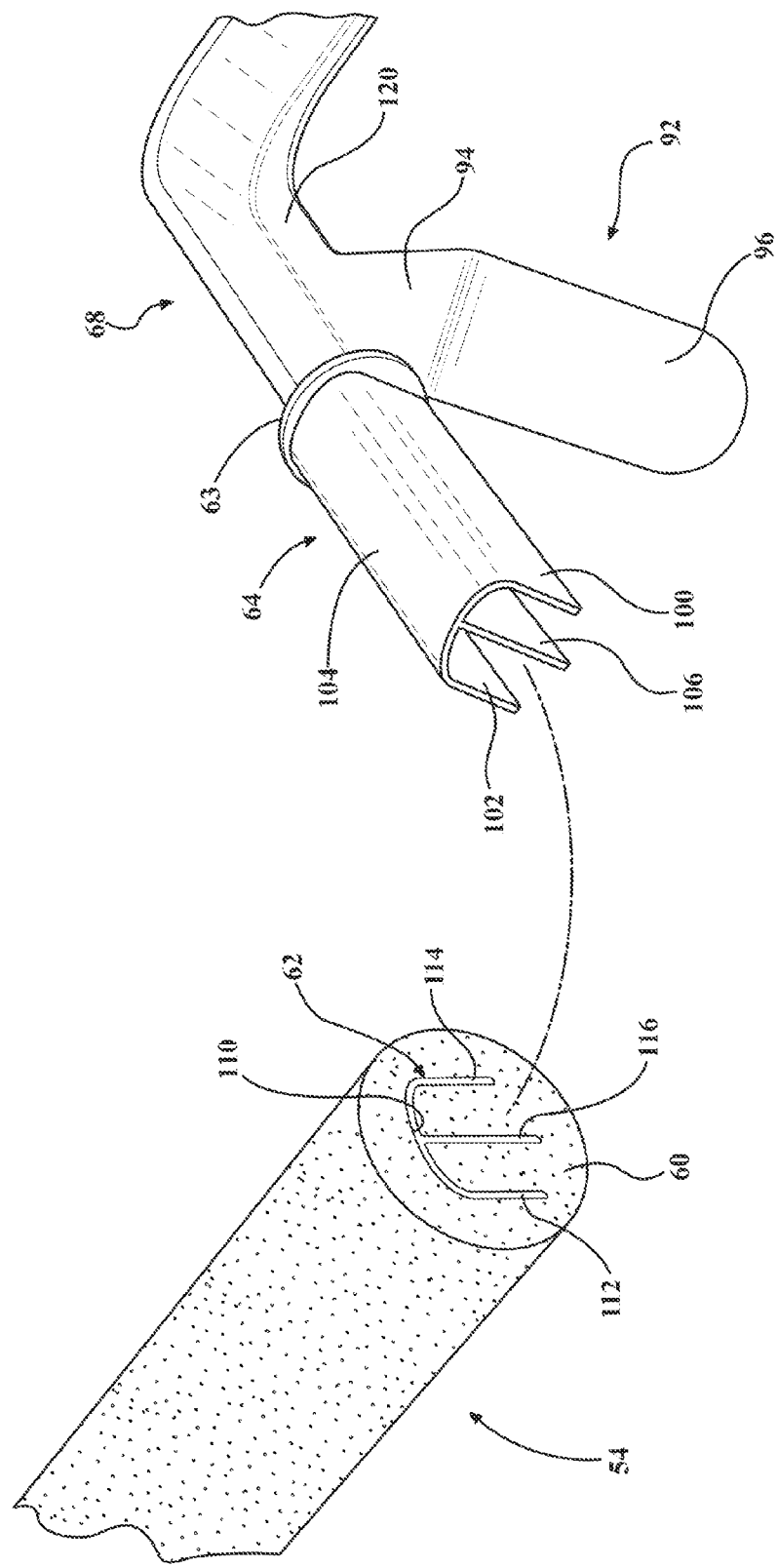
FIG. 5 is an exploded perspective view of one portion of the seat back and the connection between the mounting member and cushion.

As shown in FIG. 5, each end 60 of the cushion 54 has an interior opening 62 extending for a distance into the interior of the cushion 54 and sized to receive an end 64 of the side portions 66, 68 of the mounting member 52 in a releasable plug-in or telescoping connection.

The cushion 54 is illustrated as having a generally circular cross-section. It will be understood that the cushion 54 can have other cross-sectional shapes, such as oval, polygonal, including square, rectangular, etc., and combinations thereof.

The mounting member 52, as shown in detail in FIGS. 2-5, is illustrated, by example, as being formed of an integral one-piece member constructed of any moldable plastic, rubber, or other suitable material, such as metal, foam composite or combinations thereof. It will be understood that the mounting member 52 may be constructed of multiple, individual pieces or sections which are joined together by adhesive, fasteners, sonic welding, etc., into a unitary structure.

The mounting member 52 has generally U-shape with first and second opposed side portions 66 and 68 serving the dual function of a cushion connector and a seat support. The side portions 66 and 68 are mirror images of each other. Each side portion 66 and 68 includes a linear portion 70 extending between the end 64 and opposite end 72. By example only, each side portion 66 and 68 gradually transitions from a circular shape extending from a circular disc 63 dividing the end 64 from the linear portion 70 and servicing as a connection limiter between the cushion 54 and the mounting member 52 to a rectangular cross section along the linear portion 70 which then smoothly transitions into a 90° turned seat back encircling member or central leg 76. The central leg 76 can be any other shape, such as circular, oval, polygonal, etc.

In one aspect, the cushion 54 may have a circular cross-section that can be hollow or solid. The end 60 of the cushion 54 may have a hollow interior for telescopingly receiving the end 64 of the seat back mounting member 54 in a slide a fit. The solid portion and hollow interior of the connection between the ends 60 of the cushion 54 and the ends 64 of the seat back mounting member 72 may also be reversed.

Alternately, the end portion 64 of each side portion 66 and 68 of the mounting member 52 may have a gradually increasing tapered cylindrical shape extending from the end 64 to create a press or friction fit when each end portion 64 of the mounting member 52 is inserted into the hollow end 60 of the cushion 54.

In another aspect, shown by example in FIG. 5, the ends 64 of the seat back mounting member 52 have a generally M shape formed of first and second outer linear legs 100 and 102 which extend from a semi-circular or arcuate upper portion 104. A center linear leg 106, which may have a greater length than the length of the side legs 100 and 102 from the ends of the upper portion 104, is disposed centrally or intermediately between the spaced legs 100 and 102.

The recess 62 in each end 60 of the cushion 54 has a complimentary shape formed of a slightly curved upper recess 110 from which depend a pair of spaced outer recesses 112 and 114 having a length complimentary to the length of the side legs 100 and 102, and an intermediate or centrally disposed recess 116 having a length from the upper leg 110 substantially equal to the length of the intermediate central leg 106. This complimentary arrangement of the shape of the ends 64 of the seat back mounting member 52 and the recess 62 in each end 60 of the cushion 54 allows for secure telescoping engagement of the ends 60 of the cushion 54 onto the ends 64 of the seat back mounting member.

For rigidity, a narrow cross-section lip 120 is formed along and extends along a lower edge and extends inwardly from the side portions 66 and 68, and the central leg 76 of the seat back mounting member 52. The edge 120 extends to the circular disc 63 on the side portions 66 and 68.

An inner flange 90 is mounted along the lower edge 120 of the encircling leg 76 of the mounting member 52. The flange 90 can slip underneath the vehicle seat back headrest 40, when the seat back headrest 40 is a separate component from the seat back 22, to aid in stabilizing the mounting position of the headrest 50 on the seat back 22.

Figure 4:
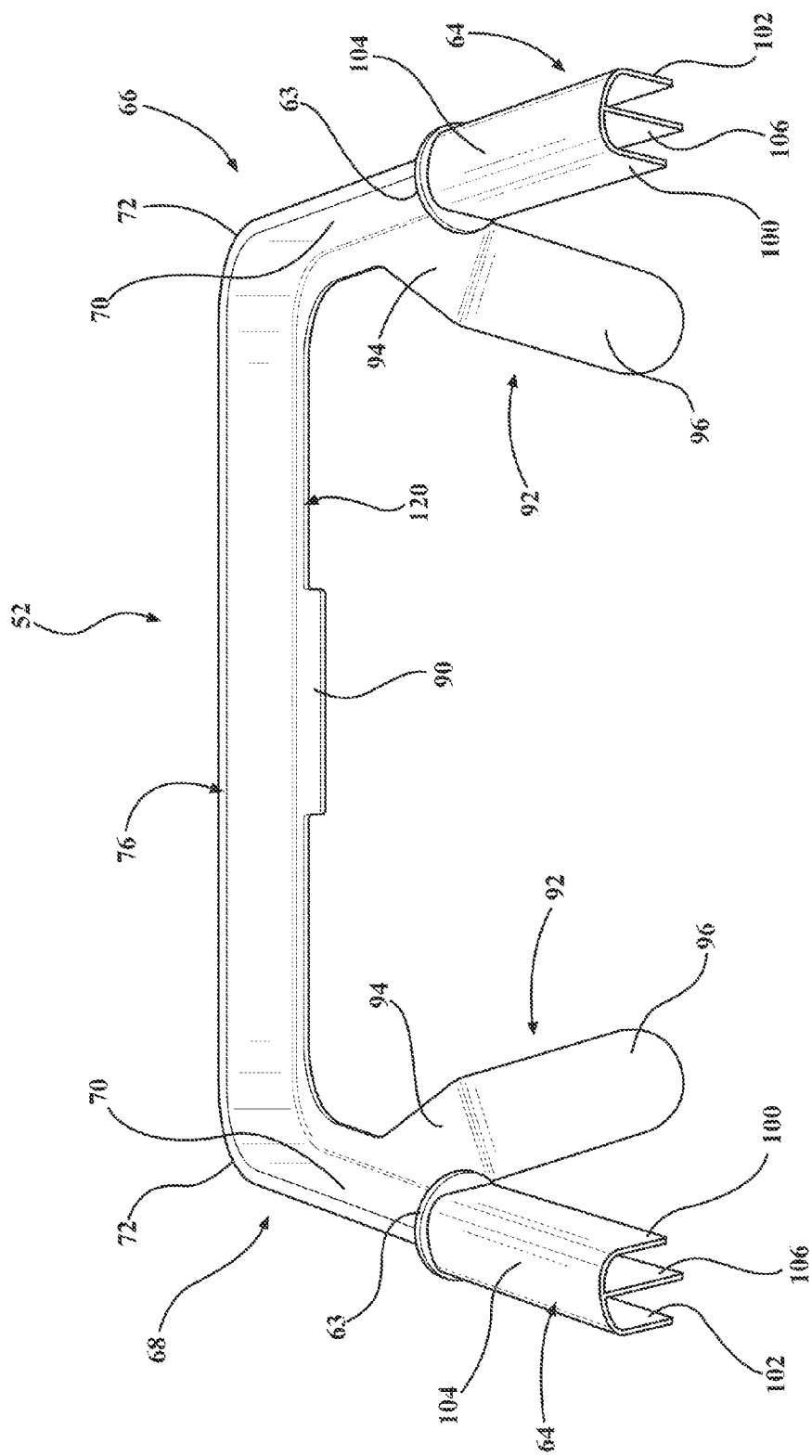
FIG. 4 is an end perspective view of the seat back headrest shown in FIG. 2, without the cushion.

Each side portion 66 and 68 of the mounting member 52 includes a seat back support, such as the support 92 on the side section 66 shown in FIGS. 4 and 5. The supports 92 include a horizontal portion 94 extending from the lower edge 120 on the side portions 66 or 68 which transitions into an angularly downward extending pad 96. As shown in FIGS. 4 and 5, the horizontal portion 94 and the pad 96 of each support 92 are disposed and extend angularly inward from the generally linear side portions 66 and 68 and the end 64 of the side portions 66 and 68. As shown in FIG. 1, the horizontal extending portions 94 are configured to lie on the top edge 26 of the seat back 22. The pads 96 extend angularly downward from each horizontal extending portion 94 to rest on the front surface 32 of the seat back 22 to support the headrest 50 on the seat back 22.

A breakaway connector, such as a pin, not shown, can be mounted through aligned apertures in each end of the cushion 54 and complimentary apertures in the end portion 64 of each side portions 66, 68 of the mounting member 52. The pin can be formed of plastic or other suitable material with a predetermined, defined break strength so as to break at a predetermined force exerted on the cushion 54 relative to the mounting member 52, such as during a vehicle collision when the cushion 54 is impacted by the user's head. The pin breaks thereby allowing the cushion 54 to separate from the mounting member 52 to minimize the potential for injury to the user's head.

What is claimed is:

1. A headrest removably engageable with a seat back having a seat back headrest comprising:
   a seat back mounting member adapted to encircle a seat back headrest and having a leg and opposed side portions extending from the leg;
   a cushion configured to surround a front and a side of a user's head;
   ends of the side portions of the seat back mounting member and opposed ends of the cushion configured for complimentary engagement; and
   a support carried on at least one of the side portions of the seat back mounting member and configured to engage a seat back to assist in supporting the seat back mounting member on a seat back, the support is integrally formed as a unitary part of the seat back mounting member.

2. The headrest of claim 1 wherein the leg and the side portions are formed as an integral one-piece member.

3. The headrest of claim 1 further comprising:
the leg and the side portions of the seat back mounting member having a polygonal cross-section.

4. The headrest of claim 1 wherein:
the seat back mounting member is formed of a molded plastic material.

5. The headrest of claim 1 wherein the support extends from the at least one of the side portions of the seat back mounting member.

6. The headrest of claim 1 further comprising:
the ends of the seatback mounting member and the opposed ends of the cushion are separably engageable.

7. The headrest of claim 6 wherein:
the ends of the seat back mounting member and the ends of the cushion have a complimentary formed projection and a recess.

8. The headrest of claim 1 further comprising:
the cushion defining a U-shape including a center portion and two opposed ends.

9. A headrest removably engageable with a seat back having a seat back headrest comprising:
a seat back mounting member adapted to encircle a seat back headrest and having a leg and opposed side portions extending from the leg;
a cushion configured to surround a front and a side of a user's head;
ends of the side portions of the seat back mounting member and opposed ends of the cushion configured for complimentary engagement; and
a support carried on at least one of the side portions of the seat back mounting member and configured to engage a seat back to assist in supporting the seat back mounting member on a seat back;
the ends of the seat back mounting and the ends of the cushion have a complimentary formed projection and recess;
wherein complimentary shaped projection and recess of the ends of the seat back mounting member and the ends of the cushion including:
an upper portion;
a pair of side legs depending from outer edges of the upper portion; and
a central leg extending from the upper portion and disposed intermediate the side legs.

10. A headrest removably engageable with a seat back having a seat back headrest comprising:
a seat back mounting member adapted to encircle a seat back headrest and having a leg and opposed side portions extending from the leg;
a cushion configured to surround a front and a side of a user's head;
ends of the side portions of the seat back mounting member and opposed ends of the cushion configured for complimentary engagement; and
two opposed supports, each support mounted on and extending from a respective side portion of the seat back mounting member and configured to engage a seat back to assist in supporting the seat back mounting member on a seat back, each of the two supports integrally formed as a unitary part of the seat back mounting member.

11. A headrest removably engageable with a seat back having a seat back headrest comprising:
a seat back mounting member adapted to encircle a seat back headrest and having a leg and opposed side portions extending from the leg, the leg of the seat back mounting member defines a polygonal member, a lower edge extends from the bottom of the leg and side portions of the seat back mounting member;
a cushion configured to surround a front and a side of a user's head;
ends of the side portions of the seat back mounting member and opposed ends of the cushion configured for complimentary engagement; and
a support carried on at least one of the side portions of the seat back mounting member and configured to engage a seat back to assist in supporting the seat back mounting member on a seat back.

12. A headrest removably engageable with a seat back having a seat back headrest comprising:
a seat back mounting member adapted to encircle a seat back headrest and having a leg and opposed side portions extending from the leg;
a cushion configured to surround a front and a side of a user's head;
ends of the side portions of the seat back mounting member and opposed ends of the cushion configured for complimentary engagement;
a support carried on at least one of the side portions of the seat back mounting member and configured to engage a seat back to assist in supporting the seat back mounting member on a seat back; and
a flange extending from the leg of the seat back mounting member, the flange adapted to be disposed beneath the seat back headrest to assist in supporting the seat back mounting member on the seat back.

* * * * *